(12) United States Patent
Geswender

(10) Patent No.: US 7,851,733 B2
(45) Date of Patent: Dec. 14, 2010

(54) METHODS AND APPARATUS FOR MISSILE AIR INLET

(75) Inventor: Chris E. Geswender, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 1117 days.

(21) Appl. No.: 11/456,396

(22) Filed: Jul. 10, 2006

(65) Prior Publication Data

US 2008/0041265 A1 Feb. 21, 2008

(51) Int. Cl.
*F41G 7/00* (2006.01)
*F42B 15/01* (2006.01)
*G06F 19/00* (2006.01)

(52) U.S. Cl. ..................................... 244/3.22
(58) Field of Classification Search ............... 244/3.22, 244/53 B, 73 R, 129.4, 129.5; 239/265; 102/476
See application file for complete search history.

(56) References Cited

U.S. PATENT DOCUMENTS

| | | | | |
|---|---|---|---|---|
| 2,684,570 A | * | 7/1954 | Nordfors | ..................... 60/245 |
| 3,115,008 A | * | 12/1963 | Cohen et al. | ................... 60/245 |
| 3,194,201 A | * | 7/1965 | Lang | .......................... 114/20.1 |
| 3,414,217 A | * | 12/1968 | Kesting | ..................... 244/3.23 |
| 3,495,605 A | * | 2/1970 | Gunnarson et al. | ......... 137/15.1 |
| 4,494,459 A | | 1/1985 | Ziemba | |
| 4,526,105 A | | 7/1985 | Herren, Jr. | |
| 6,142,417 A | * | 11/2000 | Figge, Sr. | .................. 244/53 B |
| 2004/0050056 A1 | | 3/2004 | Pederson et al. | |

* cited by examiner

*Primary Examiner*—Timothy D Collins
*Assistant Examiner*—Valentina Xavier
(74) *Attorney, Agent, or Firm*—Renner, Otto, Boisselle & Sklar, LLP

(57) ABSTRACT

Methods and apparatus for delivering a missile may operate in conjunction with a missile comprising an outer skin. The missile may be configured in a closed position and an open position. In the open position, an aperture is opened in the outer skin, for example to supply air to an air-breathing engine. In the closed position, the aperture is closed.

20 Claims, 4 Drawing Sheets

METHODS AND APPARATUS FOR MISSILE AIR INLET

FIELD OF THE INVENTION

The present invention relates to air inlets, such as air inlets for missiles.

BACKGROUND OF THE INVENTION

A cannon-fired missile typically operates in a series of steps. A first launching charge provides the pressure required to eject the missile from a gun barrel in a desired direction. After this discharge step, the missile initiates a propulsion system, such as a propulsion force comes from an engine contained in the missile body. Engines used in missile design include rocket engines, gas turbine engines, and pulse jet engines, among others. Operation of a gas turbine or other air-breathing engine may require that the missile provide those systems typical of turbine operation, including for example, an air flow system from the exterior region of the missile to an engine inlet. Thus, designs for cannon-fired missiles often call for openings in the missile body that allow air to be pulled from the exterior of the missile and into the turbine engine section. In typical turbine engine operation, the air (or a portion of the air) that is pulled into the turbine engine section is then compressed, mixed with fuel, ignited, and discharged through a nozzle section to propel the missile.

A missile structure, and particularly those missile structures associated with cannon-fired missiles, may be subjected to high G forces during launching, including set back and balloting forces. Additionally, post-launching actions, such as air guide deployment and engine start-up, may further stress the missile structure. During flight missiles may also encounter the general turbulence and stresses associated with projectile flight. However, openings in the missile skin, such as an opening to allow air flow from the exterior of the missile to the interior of the missile, may present points of weakness in the missile structure.

Space and weight are often important factors in turbine engine design. This minimal engine weight then allows, among other advantages, for the range of the missile to be extended.

SUMMARY OF THE INVENTION

Methods and apparatus for delivering a missile may operate in conjunction with a missile comprising an outer skin. The missile may be configured in a closed position and an open position. In the open position, an aperture is opened in the outer skin, for example to supply air to an air-breathing engine. In the closed position, the aperture is closed.

BRIEF DESCRIPTION OF THE DRAWINGS

A more complete understanding of the present invention may be derived by referring to the detailed description and claims when considered in connection with the following illustrative figures. In the following figures, like reference numbers refer to similar elements and steps throughout the figures.

Elements and steps in the figures are illustrated for simplicity and clarity and have not necessarily been rendered according to any particular sequence. For example, steps that may be preformed concurrently or in different order are illustrated in the figures to help to improve understanding of embodiments of the present invention.

DETAILED DESCRIPTION OF EXEMPLARY EMBODIMENTS

The present invention may be described in terms of functional block components and various processing steps. Such functional blocks may be realized by any number of hardware or software components configured to perform the specified functions and achieve the various results. For example, a system according to various aspects of the present invention may employ various frameworks, telescoping mechanisms, slidable elements, air inlet apertures, and the like, which may carry out a variety of functions. In addition, the present invention may be practiced in conjunction with any number of missile systems, projectiles, and/or inlet systems, and the system described is merely one exemplary application for the invention. Further, a system according to the present invention may employ any number of conventional techniques for opening and/or closing an aperture, forming the aperture, and the like.

Figure 1:
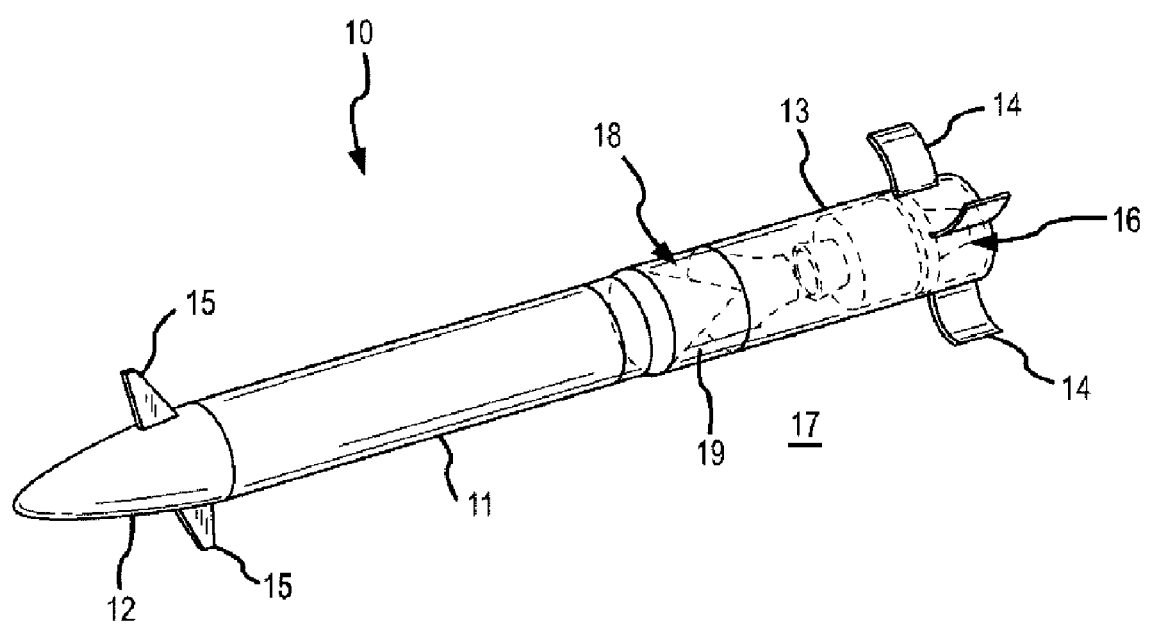
FIG. 1 is a perspective view of a missile that may include an air inlet with a multi-position air frame according to an embodiment of the present invention.
Figure 2:
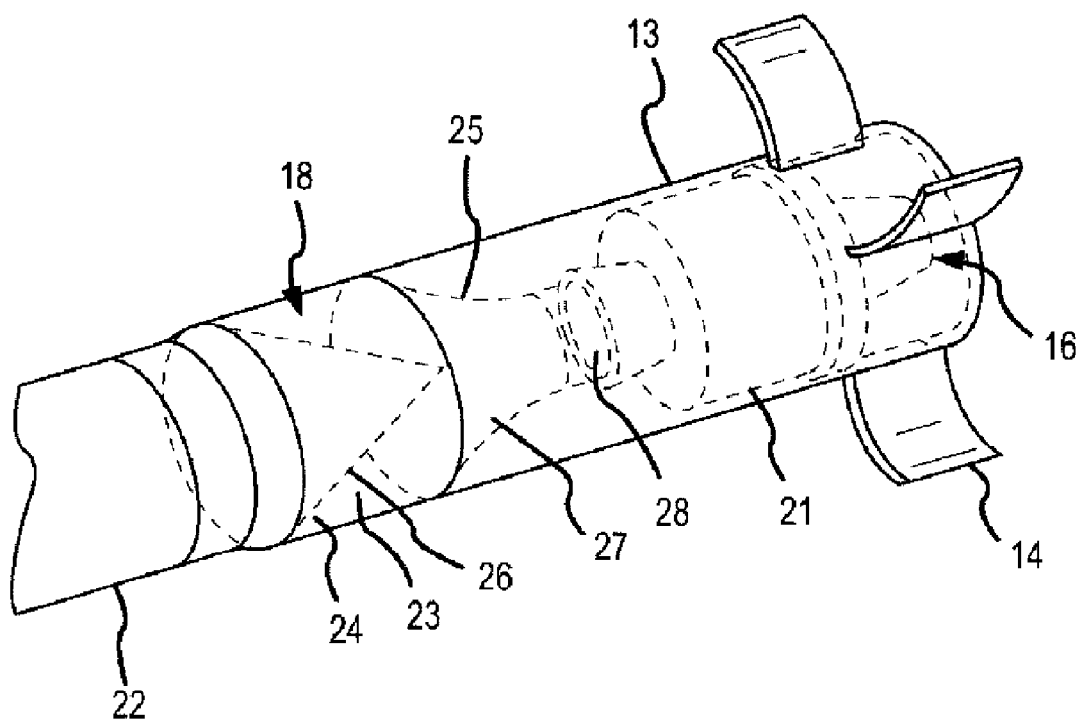
FIG. 2 is cut-away view of an aft portion of the missile.

Referring now to FIGS. 1 and 2, a missile 10 according to various aspects of the present invention is configured to selectively open an aperture 19 after launch, for example to admit air for an air-breathing engine. The missile 10 may include any suitable components, such as an outer skin 11, a nose section 12, and an aft section 13. The missile 10 may include control surfaces to control flight, such as aft fins 14 positioned on the aft section 13 of the missile 10 and forward canards 15 on the nose section 12. The missile 10 may comprise a self-propelled missile, and may also include one or more engine outlets 16 or nozzles positioned on the aft section 13. An engine 21 may comprise any suitable engine for propelling the missile 10, for example a gas turbine engine, rocket engine, and pulse jet engine.

The outer skin 11 suitably defines an exterior 17 and interior region 18 of the missile 10. The outer skin 11 may comprise any suitable material configured to define at least a portion of the exterior surface of the missile 10. Positioned within the interior region 18 of the missile 10, though not fully illustrated in FIG. 1, are any suitable missile components, such as a fuel tank 22, the engine 21, a guidance system, and a payload, for example an explosive charge. Also positioned within the interior region 18 of missile 10 is a structural framework or airframe. The framework may comprise any suitable system for providing support to the outer skin 11. The outer skin 11 may be affixed to the framework, for example via rivets, welds, or other suitable attachment mechanism.

The missile 10 may be configured to assume a closed position in which the aperture 19 is closed. For example, the missile 10 may be configured to be launched through a gun barrel. In one embodiment, when configured for gun barrel launch, the forward canards 15 and aft fins 14 can be positioned flush with the outer skin 11. Additionally, the engine outlet 16 may be sealed or covered so as to allow a pressure charge to impinge on the aft section 13 of the missile 10 without damage to the engine or engine components. During launch, aperture 19 may be closed. The closure of aperture 19 for launch inhibits high pressure gases from entering into the interior region 18 of missile 10 so as to avoid damage from the gases. Further, the interface where the nose section 12 meets the aft section 13 may be configured to transfer and sustain structural loads associated with launch. For example, the interface may include a stepped lip on each of the nose section 12 and the aft section 13 where the nose section 12 and aft section 13 meet that are configured to mate.

The missile 10 may be configured to expose the aperture 19 formed in the outer skin 11 of the missile 10 after launch. The aperture 19 may be configured in any suitable manner, such as an annular aperture 19 formed in the outer skin 11. In an open position, the aperture 19 facilitates air flow from the exterior region 17 of the missile, through the aperture 19, and into the air-breathing engine 21.

The present exemplary missile 10 may open the aperture 19 to expose an air passageway 23 defined by at least one passageway surface, such as a first air surface 24 and a second air surface 25. The first air surface 24 and second air surface 25 may comprise any suitable surfaces or structures, for example to direct air into an air inlet 28 of the engine 21. In one embodiment, the first air surface 24 and second air surface 25 each have, at least in part, a generally conical or frusto-conical, shape. The first air surface 24 may be defined by a first conical structure 26, and the second air surface 25 may be defined by a second conical structure 27. The first air surface 24 and second air surface 25 may be coordinated in shape and position so as to provide the air passageway 23 with desired airflow properties.

Figure 3:
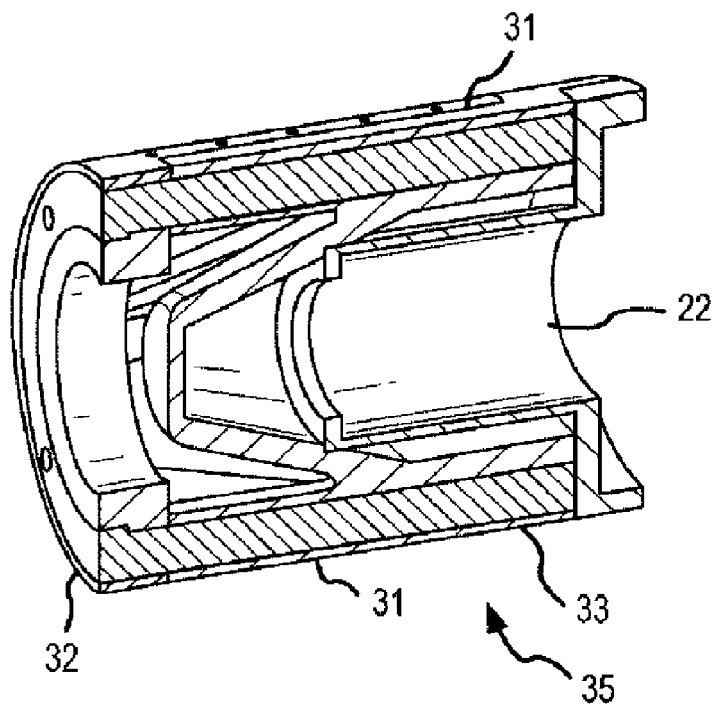
FIG. 3 is a cross-sectional view of a portion of the missile in a closed position.
Figure 4:
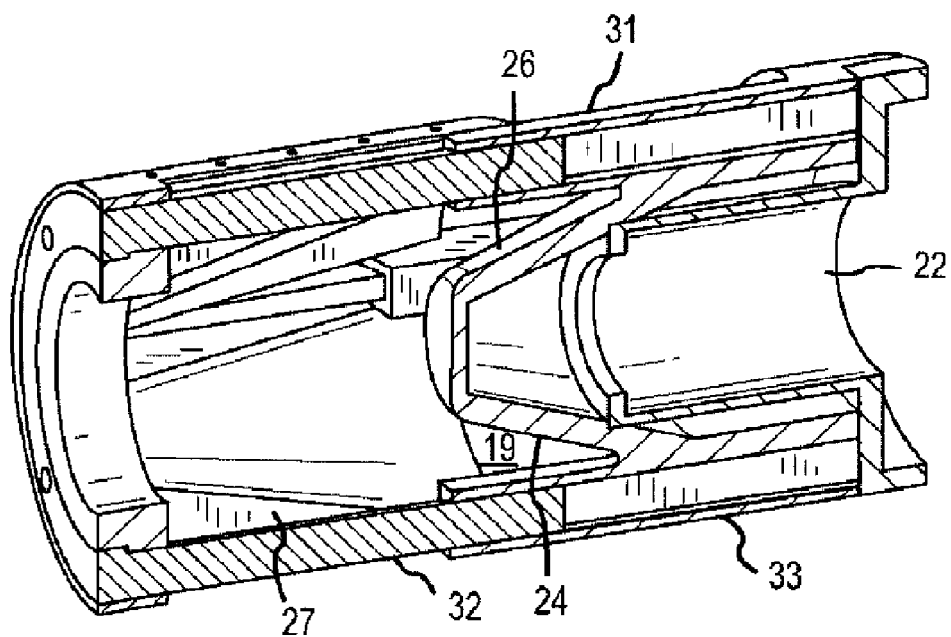
FIG. 4 is a cross-sectional view of a portion of the missile in an open position.

The missile 10 may include an aperture control system to selectively open the aperture 19 to expose the air passageway 23. The aperture control system may comprise any suitable system for selectively opening the aperture 19. For example, referring now to FIGS. 3 and 4, the aperture control system may be connected to the outer skin 11, either directly to the outer skin 11 or indirectly, for example via the framework. In the present embodiment, the aperture control system comprises a telescoping mechanism 35 that moves the aft section 13 and the associated aft skin section relative to the nose section 12 and the associated nose skin section between a closed position (FIG. 3) and an open position (FIG. 4). In one embodiment, the telescoping mechanism 35 includes multiple sets of slidable arms 31. The slidable arms 31 can move longitudinally from the closed to the open position. The slidable arms 31 are connected to and/or form a portion of the missile framework, and the slidable arms 31 provide a point in the framework at which the framework can extend longitudinally. By moving from the closed to the open position, the slidable arms 31 act to open aperture 19 in the outer skin 11 of missile 10. The longitudinal movement of the slidable arms 31 from the closed to the open position also acts to extend the overall length of missile 10. The slidable arms 31 may also provide a structural joint in the airframe structure of missile 10. The slidable arms 31 are positioned and structured so as to withstand torsional movement that arises from rotation of missile 10. The slidable arms 31 further withstand the longitudinal pressures and stresses that the missile 10 experiences during flight as well as during launch.

The slidable arms 31 may be connected to the structural framework of the missile 10. Forces upon the missile 10 can be transferred from a forward position to an aft position, and vice versa, through the slidable arms 31. The connection between slidable arms 31 and the framework may comprise conventional connections, such as integral connections, rivets, bolts, and/or welds. In one embodiment, one member, either a male member 32 or female member 33, is connected to a forward section of the structural framework, and the counterpart member is connected to the opposite section of the structural framework. A typical structural framework used in missile construction may have forms that are lattice-like or honeycombed in overall configuration. The components of the missile 10, including the structural framework, outer skin 11, aft fins 14, forward canards 15, and slidable arms 31, may be constructed of conventional materials, such as aluminum or aluminum alloys for missiles and steel or titanium for projectiles.

In the present embodiment, each slidable arm 31 each includes a male member 32 and a female member 33. Each pair of male member 32 and female member 33 may be formed so as to allow longitudinal movement between them. The longitudinal movement allowed is sufficient to permit the slidable arms 31 to move from the closed position, as shown in FIG. 3, to the open position, illustrated in FIG. 4. The male member 32 and female member 33 can take any suitable shape, such as square or rectangular in cross section. The reciprocal rectangular shape allows for a slidable fitting between members 32, 33 for longitudinal movement while resisting the twisting that arises from torsional movement of the missile 10.

When the male member 32 and female member 33 in the closed or the open position, a locking mechanism (not shown) may resist longitudinal movement of the slidable arms 31. When a missile 10 is fired from a gun, the slidable arms 31 may locked in the closed position. The locking mechanism for the slidable arms 31 is capable of being unlocked so that, after firing, the slidable arms 31 can move to the open position. The locking mechanism may be selected from any suitable locking mechanism and/or actuator, such as explosive bolts, spring locks, and solenoid-activated bolts.

When in the open position, as seen in FIG. 4, the slidable arms 31 may lock in the open position. The locking mechanism may be any suitable locking mechanism and/or actuator, such as spring locks and solenoid-activated bolts. The degree of locking may be sufficient to resist the torsional and longitudinal forces that the missile 10 encounters during launch and flight.

The movement of the slidable arms 31 causes a movement of the missile structure along the longitudinal axis of missile 10. The longitudinal movement of the slidable arms 31, and the corresponding movement of the missile structure, aligns the first air surface 24 and the second air surface 25. The degree of travel that occurs in transitioning the missile 10 from the closed to the open position separates these surfaces by a desired amount so as to provide a desired shape to the air passageway 23.

The aperture 19 may admit air substantially at all angular positions relative to the longitudinal axis of the missile 10. In such an embodiment, any obstructions, including the slidable arms 31, do not significantly restrict air flow through the aperture. The slidable arms 31 may exhibit a small enough cross-section so as not to unduly inhibit air flow through the aperture.

Figure 5:
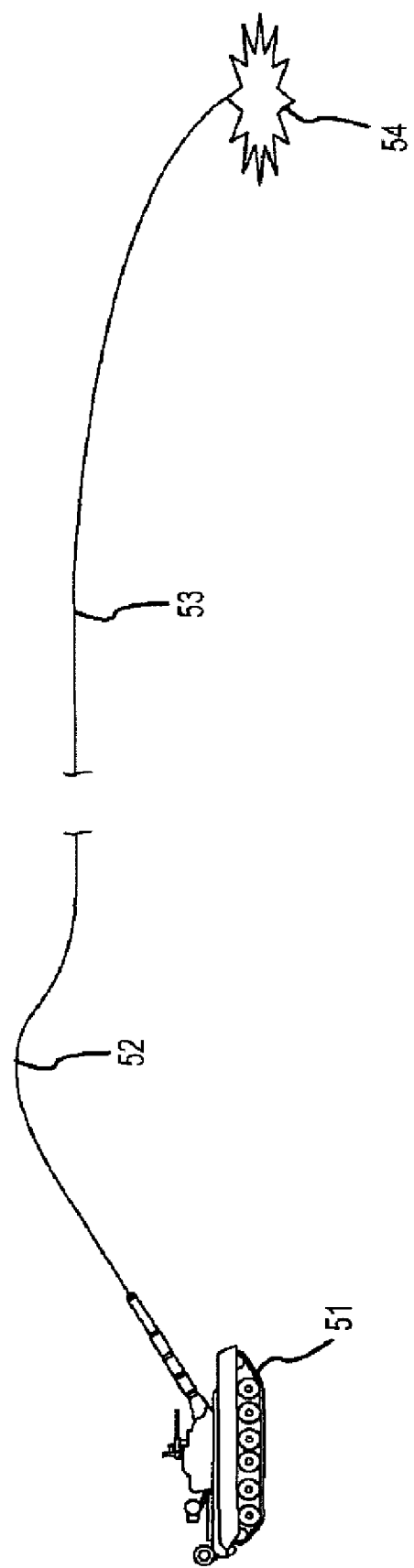
FIG. 5 illustrates a trajectory of a missile.

Referring now to FIG. 5, the missile 10 may be loaded into a gun 51, aircraft, submarine, or other system capable of launching the missile 10. The missile 10 is initially in the closed posisiton. In the closed position, missile 10 is capable of withstanding the pressures and stresses that would be encountered from firing so as to operate as intended after firing. Further, the aperture 19 may be sealed when in the closed position to inhibit damage to the missile 10 occurring from the penetration of gases through the closure seal into the interior of the missile 10.

After the missile 10 is launched, the missile 10 may travels for a distance as a ballistic projectile without any self-propelled force. At some time after firing, the missile 10 may move to the open position and fire the engine 21 to initiate self-propelled flight. The trigger to convert to the open position and begin powered flight can be any suitable event, such as a time after launch or when the missile reaches a desired trajectory point 52, for example the apogee of the cannon-fired trajectory. Upon opening, missile 10 exposes aperture 19. The opening of aperture 19 allows engine 21 to receive air through air passageway 23 and into an air inlet 28. During normal engine operation, the air mixes with fuel, burns, and exits through the nozzle. The continuous operation of the engine may draw a continuous flow of air through aperture 19.

The missile 10 may continue powered flight along a desired path 53 until it reaches a desired point in its flight path. The missile 10 can be directed to its target 54 under power or through free fall.

While the invention has been described with reference to an exemplary embodiment, various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A missile comprising:
   a framework;
   an outer skin attached to the framework defining an exterior region of the missile and an interior region of the missile, wherein the outer skin defines an aperture;
   an engine disposed at least partially within the interior region;
   a passageway surface defining a passageway between the engine and the aperture;
   and
   an aperture control system connected to the outer skin and configured to selectively open the aperture;
   wherein the aperture control system comprises at least one slidable arm connected to the structural framework, wherein the slidable arm is configured to longitudinally move from a closed position to an open position to open the aperture in the outer skin; and
   wherein the at least one slidable arm forms part of the outer skin.

2. A missile according to claim 1, wherein the slidable arm comprises:
   a female member; and
   a male member at least partially disposed within the female member.

3. A missile according to claim 2, wherein the male member and female member are at least partially rectangular in cross-section.

4. A missile according to claim 1, further comprising a locking mechanism connected to the slidable arm configured to lock the slidable arm in at least one of an open position and a closed position.

5. A missile comprising:
   a framework;
   an outer skin attached to the framework defining an exterior region of the missile and an interior region of the missile, wherein the outer skin defines an aperture;
   an engine disposed at least partially within the interior region;
   a passageway surface defining a passageway between the engine and the aperture;
   and
   an aperture control system connected to the outer skin and configured to selectively open the aperture;
   wherein the aperture comprises an annular aperture around a circumference of the outer skin;
   wherein the aperture control system comprises slidable arms extending around the circumference of the outer skin; and
   wherein the slidable arms each include a female member and a male member, wherein the female members longitudinally move relative to the male members from a closed position to an open position, to open the aperture.

6. A missile according to claim 1, wherein the passageway surface comprises:
   an aft surface extending between an aft edge of the aperture and the engine, wherein at least a portion of the aft surface is conical; and
   a forward surface extending between a forward edge of the aperture and a terminus, wherein:
      the terminus is disposed forward of the engine along a longitudinal axis of the missile; and
      at least a portion of the forward surface is conical.

7. A missile according to claim 6, wherein the aperture control system moves the aft surface away from the forward surface in conjunction with opening the aperture.

8. A missile, comprising:
   a framework, comprising a nose section and an aft section, wherein the nose section is configured to move longitudinally relative to the aft section between an open position and a closed position; and
   a skin, comprising a nose skin section and an aft skin section wherein:
      the nose skin section is attached to the nose section;
      the aft skin section is attached to the aft section;
      a forward edge of the aft skin section engages an aft edge of the nose skin section in the closed position;
      the forward edge of the aft skin section is separated from the aft edge of the nose skin section in the open position; and
      the forward edge of the aft skin section and the aft edge of the nose skin section define an annular aperture in the open position;
   an aperture control system connected to the framework and configured to move the framework between the open position and the closed position;
   an engine; and
   an air surface defining a passageway between the aperture and the engine;
   wherein the aperture control system comprises a plurality of slidable arms, wherein:
      a first end of each slidable arm is connected to the nose section;
      a second end of each slidable arm is connected to the aft section; and
      each slidable arm is configured to move between the closed position and the open position; and wherein the slidable arms form part of an outer skin of the missile.

9. A missile according to claim 8, wherein each of the slidable arms comprises:
   a female member; and
   a male member at least partially disposed within the female member.

10. A missile according to claim 9, wherein the male member and female member are at least partially rectangular in cross-section.

11. A missile according to claim 10, further comprising a locking mechanism connected to the slidable arms configured to lock the slidable arms in at least one of an open position and a closed position.

12. A missile according to claim 8 wherein the air surface comprises:
   a forward surface extending between the aft edge of the nose skin section and a terminus, wherein:
      the terminus is disposed forward of the engine along a longitudinal axis of the missile; and
      at least a portion of the forward surface is conical; and
   an aft surface extending between the forward edge of the aft skin section and the engine, wherein at least a portion of the aft surface is conical.

13. A missile according to claim 12, wherein the aperture control system moves the aft surface away from the forward surface in conjunction with opening the aperture.

14. A missile, comprising:
   a nose section having a nose skin section; and an aft section having an aft skin section;
   wherein the nose section moves relative to the aft section between an open position and a closed position;
   wherein a forward edge of the aft skin section engages an aft edge of the nose skin section in the closed position;
   wherein the forward edge of the aft skin section is separated from the aft edge of the nose skin section in the open position; and
   wherein the forward edge of the aft skin section and the aft edge of the nose skin section define an aperture in the open position;
   further comprising slidable arms of one of the sections that move longitudinally relative to the other of the sections as the nose section moves relative to the aft section between the open position and the closed position;
   wherein the slidable arms provide a structural joint in an airframe structure of the missile, between the nose section and the aft section; and wherein the slidable arms form part of an outer skin of the missile.

15. The missile of claim 14, wherein each of the slidable arms comprises:
   a female member; and
   a male member at least partially disposed within the female member.

16. The missile of claim 15, wherein the male members are parts of one of the skin sections, and the female members are parts of the other of the skin sections.

17. The missile of claim 14 wherein the nose section moves longitudinally relative to the aft section between the open position and the closed position.

18. The missile of claim 17, wherein longitudinal movement of the nose section relative to the aft section, from the closed position to the open position, extends overall length of the missile.

19. The missile of claim 14 wherein the aperture in the open position is an annular aperture.

20. The missile of claim 14 further comprising:
   an engine; and
   an air surface defining a passageway between the aperture and the engine.

* * * * *